US012591464B1

(12) United States Patent
Rossman et al.

(10) Patent No.: US 12,591,464 B1
(45) Date of Patent: Mar. 31, 2026

(54) MANAGING SERVICE POLICIES BASED ON CONTEXT

(71) Applicant: Amazon Technologies, Inc., Seattle, WA (US)

(72) Inventors: Hart Matthew Rossman, Vienna, VA (US); Tyson Campbell Garrett, Mosman (AU); James Jacob Obi, Folly Beach, SC (US)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 17/656,344

(22) Filed: Mar. 24, 2022

(51) Int. Cl.
G06F 9/50 (2006.01)
G06F 40/226 (2020.01)
G06Q 10/0631 (2023.01)

(52) U.S. Cl.
CPC .......... G06F 9/5077 (2013.01); G06F 40/226 (2020.01); G06Q 10/06315 (2013.01)

(58) Field of Classification Search
CPC ............... G06F 9/5077; G06F 40/226; G06Q 10/06315
See application file for complete search history.

(56) References Cited

U.S. PATENT DOCUMENTS

| | | | | | |
|---|---|---|---|---|---|
| 2002/0080771 | A1* | 6/2002 | Krumel | ................... | H04L 67/12 370/352 |
| 2003/0072025 | A1* | 4/2003 | Simpson | ................. | G06F 3/125 358/1.15 |
| 2003/0135596 | A1* | 7/2003 | Moyer | .................. | H04L 41/022 709/246 |
| 2004/0123150 | A1* | 6/2004 | Wright | .................... | G06F 21/32 726/1 |
| 2004/0177247 | A1* | 9/2004 | Peles | ....................... | H04L 63/08 713/155 |
| 2009/0182874 | A1* | 7/2009 | Morford | ................. | H04L 43/08 709/224 |
| 2010/0150102 | A1* | 6/2010 | Li | ........................ | H04W 36/247 455/436 |
| 2010/0275248 | A1* | 10/2010 | Li | ........................... | H04L 67/51 709/224 |
| 2010/0296415 | A1* | 11/2010 | Sachs | .................... | H04W 48/18 370/254 |
| 2012/0096513 | A1* | 4/2012 | Raleigh | .................. | H04W 8/18 709/224 |
| 2013/0081102 | A1* | 3/2013 | Beauvais | .............. | G06F 21/552 726/1 |
| 2013/0142042 | A1* | 6/2013 | Garcia Martin | .... | H04L 12/5692 370/230 |

(Continued)

*Primary Examiner* — Tuan C Dao

(74) *Attorney, Agent, or Firm* — Knobbe, Martens, Olson & Bear, LLP

(57) ABSTRACT

The present disclosure generally relates to a policy management service that can receive control policy inputs from customers that correspond to a service context. The policy management service parses the control policy input to identify at least one network service and a control policy corresponding to the identified network service. Additionally, the policy management service then identifies one additional network service that has been characterized as a complimentary function to the identified network service. The policy management service can translate or generate additional control policies for the identified additional network service that correspond to the previously identified control policy.

23 Claims, 4 Drawing Sheets

*100*

(1) CONTROL POLICY INPUTS

*102*

CUSTOMER COMPUTING DEVICE

*110*

NETWORK-BASED SERVICES

SERVICE *112A* ... SERVICE *112B*

POLICY MANAGEMENT SERVICE *114*

*116*

(2) PARSE AND PROCESS CONTROL POLICY INPUT;
(3) IDENTIFY ADDITIONAL SERVICES WITH COMPLIMENTARY FUNCTION;
(4) TRANSLATE AND GENERATE CONTROL POLICIES FOR ADDITIONAL SERVICES;
(5) VALIDATE CONTROL POLICIES FOR CUSTOMER PREFERENCES;
(6) VALIDATE CONTROL POLICIES FOR IMPLEMENTATION

(56) References Cited

U.S. PATENT DOCUMENTS

| | | | | |
|---|---|---|---|---|
| 2013/0293363 A1* | 11/2013 | Plymouth | ........... | H04L 63/1425 |
| | | | | 340/309.16 |
| 2014/0081684 A1* | 3/2014 | Hadar | .................... | G06Q 10/06 |
| | | | | 705/7.41 |
| 2014/0250229 A1* | 9/2014 | Prokopenko | .......... | H04L 69/329 |
| | | | | 709/226 |
| 2014/0376371 A1* | 12/2014 | Flinck | ................... | H04L 47/125 |
| | | | | 370/230 |
| 2015/0127844 A1* | 5/2015 | Phillips | ................ | H04L 67/535 |
| | | | | 709/231 |
| 2016/0132608 A1* | 5/2016 | Rathod | .................. | H04W 4/21 |
| | | | | 707/722 |
| 2016/0156635 A1* | 6/2016 | Liu | ....................... | H04L 63/102 |
| | | | | 726/4 |
| 2016/0218933 A1* | 7/2016 | Porras | ................... | H04L 41/147 |
| 2016/0219078 A1* | 7/2016 | Porras | .................... | H04L 41/22 |
| 2023/0091527 A1* | 3/2023 | Sapp | ....................... | H04L 63/20 |
| | | | | 726/13 |

* cited by examiner

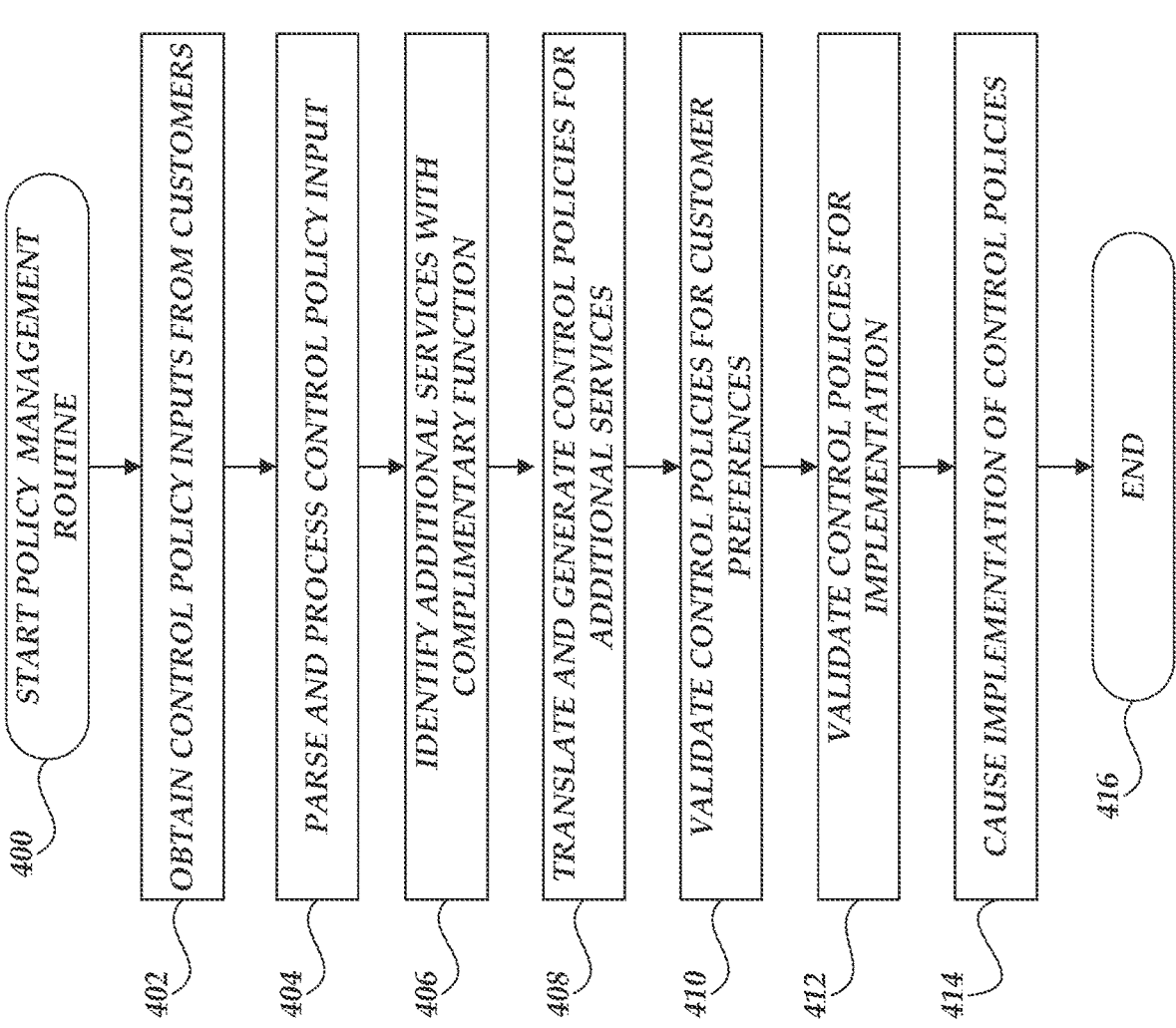

*Fig. 4.*

400 START POLICY MANAGEMENT ROUTINE

402 OBTAIN CONTROL POLICY INPUTS FROM CUSTOMERS

404 PARSE AND PROCESS CONTROL POLICY INPUT

406 IDENTIFY ADDITIONAL SERVICES WITH COMPLIMENTARY FUNCTION

408 TRANSLATE AND GENERATE CONTROL POLICIES FOR ADDITIONAL SERVICES

410 VALIDATE CONTROL POLICIES FOR CUSTOMER PREFERENCES

412 VALIDATE CONTROL POLICIES FOR IMPLEMENTATION

414 CAUSE IMPLEMENTATION OF CONTROL POLICIES

416 END

MANAGING SERVICE POLICIES BASED ON CONTEXT

BACKGROUND

Generally described, computing devices and communication networks can be utilized to exchange data and/or information. In a common application, a computing device can request content from another computing device via the communication network. For example, a user having access to a computing device can utilize a software application to request content or access network-hosed applications/functionality from a computing device via the network (e.g., the Internet). In such embodiments, the user's computing device can be referred to as a client computing device and the network-based computing device can be referred to as a service provider. Additionally, the client computing device can collect or generate information and provide the collected information to a network-based computing device for further processing or analysis.

In some embodiments, a network service provider can provide computing device resources, such as virtual machine instances, that are configurable to execute tasks based on network service provider customers. In some scenarios, it may be possible that one or more network-based resources to implement policies or attributes based on specifications.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 4 is a flow diagram depicting an example routine for a policy management and generation routine for processing control policy inputs in accordance with aspects of the present application.

DETAILED DESCRIPTION

Figure 1:
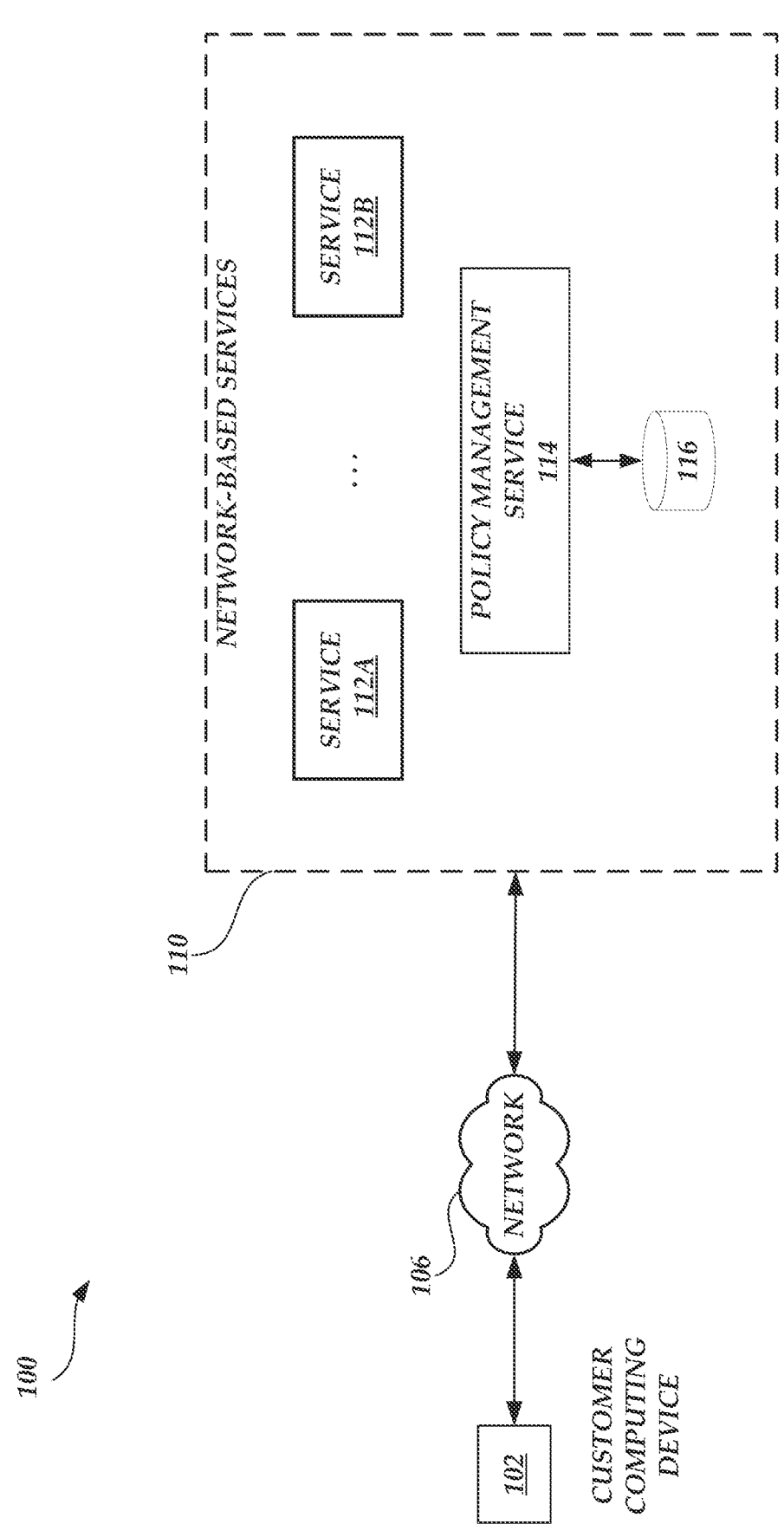
FIG. 1 is a block diagram depicting an illustrative system for implementing a network service for implementing a policy management service according to one or more aspects of the present application.

Aspects of the present disclosure relate to systems and methods a policy management service. More specifically, aspects of the present application can correspond to a policy management service that can receive control policy inputs from customers. Illustratively, the control policy inputs correspond to, or otherwise can be used to define, a service context that can be utilized to identify at least one control policy to be implemented in a network service. The control policy input can be provided by customers in a variety of forms, which can include a specification of identified services, service types, or action types that will implement a control policy or set of control policies. In other embodiments, the control policy input can also explicitly exclude some information, such as the exclusion of any specific service or service type.

In one aspect, the policy management service parses the control policy input to identify at least one network service and a control policy corresponding to the identified network service. For example, the identified network service can correspond to a data storage service, data processing service, application hosting services, etc. Additionally, the policy management service then identifies one additional network service that has been characterized as a complimentary function to the identified network service. The one additional network service does not need to be identified in the control policy input. With reference to the previous example, the additional network services can include access control services, data backup/redundancy services, etc. The policy management service can identify the additional network service based on correlations of network services, attribute searches, and the like. The policy management service can translate or generate additional control policies for the identified additional network service that correspond to the previously identified control policy.

In further aspects of the present application, the policy management service can conduct one or more validation or verification processes based on the generated control policies. In one embodiment, the validation or verification processes can include verification that the specific control policies either satisfy customer preferences or are otherwise not prohibited. For example, the policy management service can validate that the control policy would not exceed specified financial policies, thresholds, etc. In another embodiment, the validation or verification processes can include verification that the specific control policies can be implemented by the additional network services or that would otherwise not result in conflicts respective to the identified service control policy or result in errors in the additional network services.

Traditional network services allow for individualized management of the network services through the use of control policies. In certain scenarios, a customer may wish to achieve a desired outcome through the use of control policies. For example, a customer may wish to adopt security control policies that can limit or filter information (e.g., credit card numbers) that is generated or made accessible by network services. To achieve the desired outcome, all the network services that are used by the customer may have to implement some form of respective control policy, such as illustrative security control policies. The traditional approach to control policies can be deficient in a number of ways. First, customers must be fully aware of all the network services that are utilized by the customer, including dependent services that provide complimentary functionality. Such dependent services that provide complimentary functionality may not always have customer facing interfaces or be readily apparent to the customer. For example, implementation of a security policy for an application hosting service to manage access does not manage access to any complimentary data backup services, application failover services, etc.

Additionally, for the set of network services that are known and configurable by customers, the individualized nature of network service control policy management requires network service customers to have higher degree of knowledge as to control policy semantics for each individual service. For example, individual network services may have different formats, attributes, ranges, and are susceptible to misconfiguration or inconsistent implementation. More specifically, in a set of network services having multiple dependent services with complimentary functionality, implementation of a desired function, such as access control list implementation, can require vastly different control policies based on the role or function of the service. Accordingly, individual control policies for a set of control policies may not necessarily be able to be simply copied or ported. Additionally, in some applications, the complimentary services may not correspond to outwardly facing network services that are configurable by users, such as services that may be executed within network computing device resources.

As described above, to address at least some portion of these deficiencies, aspects of the present application can correspond to a policy management service that can receive control policy inputs from customers. Illustratively, the control policy inputs correspond to a service context that can be utilized to identify at least one control policy to be implemented in a network service. The control policy input can be provided by customers in a variety of forms, which can include a specification of identified services, service types, or action items. In other embodiments, the control policy input can also explicitly exclude some information, such as the exclusion of any specific service or service type by indication of a desired outcome/action type without identifying the network service that will be utilized to implement the outcome/action type. In still other embodiments, the control policy input can identify an existing network service and control policy that will function as representative of the control policy to be implemented in other network services or in the additional network services (as described herein).

The policy management service illustratively parses the control policy input to identify at least one network service and a control policy corresponding to the identified network service. For example, the policy management service can identify keywords or identifiers from the control policy input. The parsing of the control policy input can be implemented based on the type of input received, the type of interface utilized (e.g., input from a graphical UI vs. textual input), customer specific preferences, and the like. Additionally, the policy management service then identifies one additional network service that has been characterized as a complimentary function to the identified network service. The one additional network service does not need to be identified in the control policy input. The policy management service can identify the additional network service based on correlations of network services, attribute searches, and the like. The policy management service can translate or generate additional control policies for the identified additional network service that correspond to the previously identified control policy.

Prior to implementation of the generated or identified set of control policies, the policy management service can perform various validations or verifications to ensure that the generated control policies conform to individual rules or are otherwise not inconsistent as a set of control policies and to ensure that the control policies are consistent with customer preferences. For example, the policy management service can verify that the generated policies do not cause violation of customer specified financial criteria, exceed attribute thresholds, or do not violate prohibited actions. In another example, the policy management service can verify that the generated set of control policies do not conflict with the configuration of network services or would otherwise generate errors in the execution of network services.

Although various aspects of the present application will be described with regard to illustrative network components, interactions and routines, one skilled in the relevant art will appreciate that one or more aspects of the present application may be implemented in accordance with various environments, system architectures, computing device architectures and the like. Additionally, the examples are intended to be illustrative in nature and should not be construed as limiting.

FIG. 1 depicts a block diagram of an embodiment of the system 100. The system 100 can comprise a network, the network connecting a number of computing devices 102 and a network service 110 via a communication network 106. Illustratively, the various aspects associated with the network service 110 can be implemented as one or more components that are associated with one or more functions or services. The components may correspond to software modules implemented by one or more computing devices, which may be separate stand-alone computing devise. Accordingly, the components of the network service 110 should be considered as a logical representation of the service, not requiring any specific implementation on one or more computing device.

The network 106 depicted in FIG. 1 connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network and the hardware and software in the network service provider that provide those services. In some embodiments, the network may be a content delivery network.

The computing devices 102 in FIG. 1 can connect to the network and the network service 110. Solely for purposes of illustration, computing devices 102 that will access one or more services 112 maintained by the network service 110. The computing devices 102 can be configured to transmit a request to the network service 110 to illustratively access one or more network-based services using a communication protocol. The computing devices 102 are configured to have at least one processor. That processor can be in communication with memory for maintaining computer-executable instructions. The computing devices 102 may be physical or virtual. The computing devices may be mobile devices, personal computers, servers, or other types of devices. The computing devices 102 may have a display and input devices through which a user can interact with the user-interface component.

Illustratively, the network service 110 can include a plurality of network-based services that can provide functionality responsive to configurations/requests transmitted by the client computing devices 102, such as in the implementation of a set of microservices that are configured to provide underlying functionality to applications hosted by a service provider. As illustrated in FIG. 1, the network-based services include as set of network-based services 112A, 112B, etc. Illustratively, each network-based service can be configured with defined functionality based on configuration information or executable commands. Illustratively, the network-based services 112A, 112B represent different logical or geographic regions provided by the network service 110. Additionally, although a set of services 112A-112B are generally referred to as "network services", such designation does not require that all such services are directly accessible via a network, such as network 106. For example, one or more "network" services 112 may correspond to processes executed by the network 110 in a computing environment, in which external access to the network 106 is not configured. By way of illustration, a data encryption or data management service that does not provide any external network access may be executed by the network service 110 to manage data maintained by another service, such as a data hosting service.

The network service 110 further includes a policy management service 114 that represent the various functionality to receiving customer control policy inputs and generating control policies for network-based resources, such as one or more of the network-based services 112A, 112B. The policy management service 114 can be further associated with a control policy data store 116 related to correlation information for identifying dependencies of network services and individualized control policy semantics. Additionally, the control policy data store 116 can include verification and validation information utilized by the policy management service 114. Illustrative components of the policy management service 114 will be illustratively described with regard to FIG. 2, although the functionality attributed to the policy management service 114 may be implemented in any one of a number of computing devices. Similarly, the control policy data store 116 may be implemented in any number of computing devices for maintaining data in a centralized or distributed manner.

Figure 2:
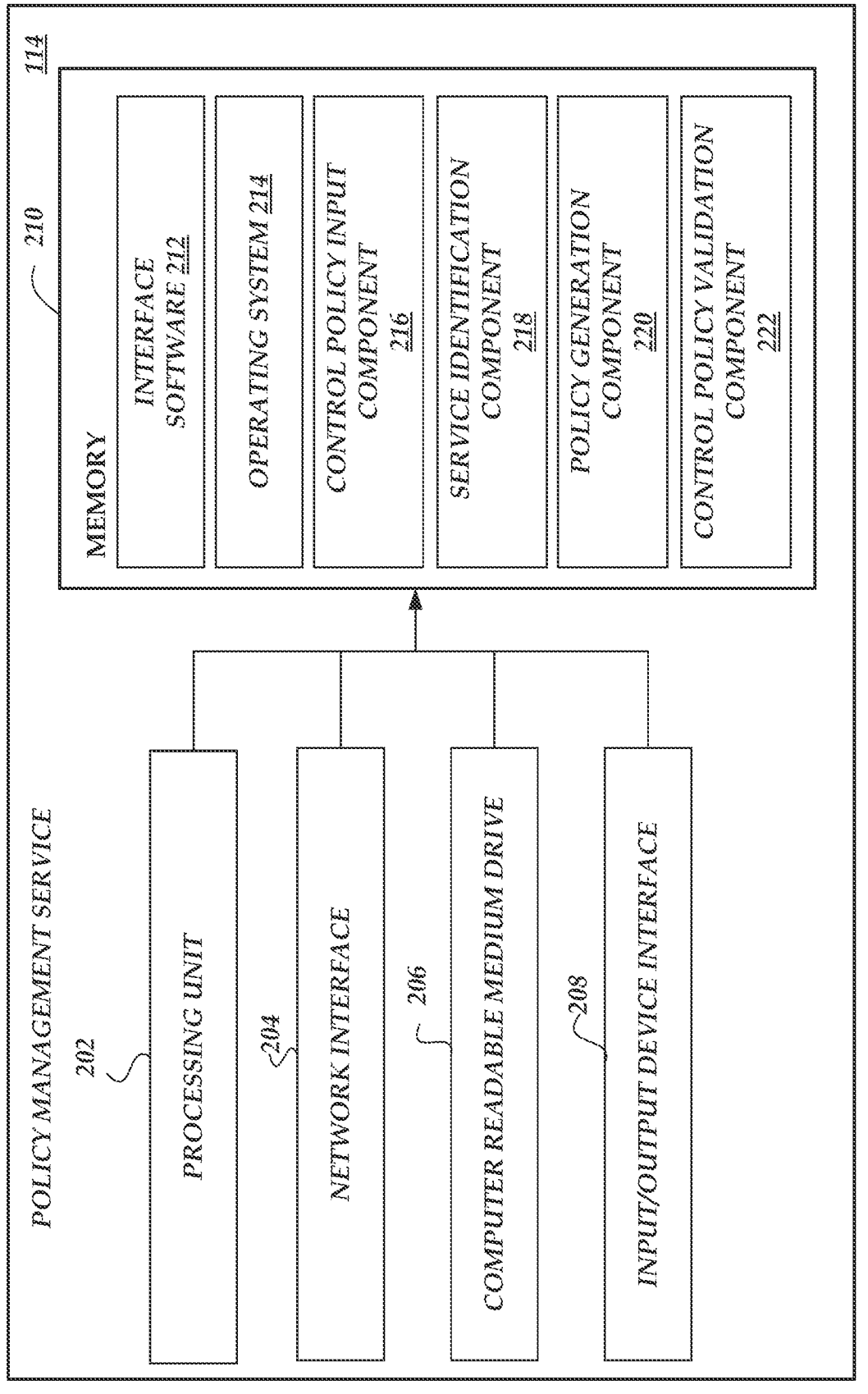
FIG. 2 is a block diagram illustrative of components of a policy management service in accordance with aspects of the present application.

FIG. 2 depicts one embodiment of an architecture of an illustrative server for implementing the policy management service 114 as described. The general architecture of the policy management service 114 depicted in FIG. 2 includes an arrangement of computer hardware and software components that may be used to implement aspects of the present disclosure. As previously discussed, the components of the policy management service 114 may include physical hardware components, one or more virtualized components or a combination thereof. Additionally, the components of the policy management service 114 or the functionality attributed by the interface component service may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the policy management service 114.

As illustrated, the policy management service 114 includes a processing unit 202, a network interface 204, a computer readable medium drive 206, and an input/output device interface 208, all of which may communicate with one another by way of a communication bus. The components of the policy management service 114 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208 In some embodiments, the policy management service 114 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the policy management service 114. The memory 210 may further include computer program instructions and other information for implementing aspects of the present disclosure. For example, in one embodiment, the memory 210 includes a control policy input component 216 that is configured to parse control policy inputs provided by customer to identify service contexts as described herein. The memory 210 further includes a service identification component 218 that is configured to identify additional services having complimentary functions to network services identified in the service context as described herein. The memory 210 further includes a policy generation component 220 that is configured to translate or generate control policies for additional network services that have been identified as described herein. The memory 210 further includes a control policy validation component 222 that is configured to implement one or more verification or validation process for a set of generated control policies to be implemented by the network services. As described previously, the components in memory 210 represent various functionality that can be implemented by the policy management service 114. Such components may be executed in separate computing devices (virtual or physical computing environments).

Figure 3:
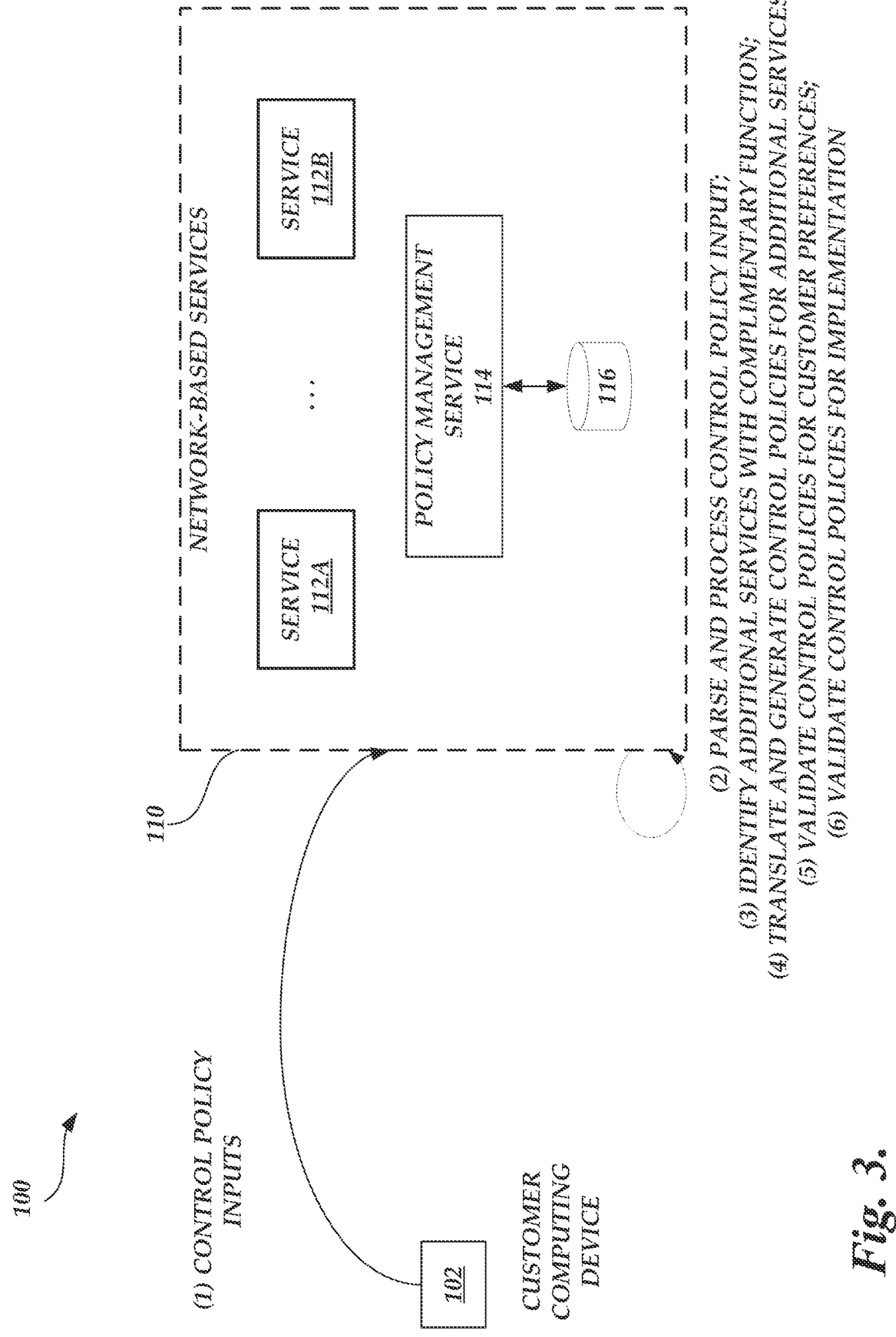
FIG. 3 is a block diagram of the system of FIG. 1 illustrating various interactions of the components related to generating and providing network service control policies based on control policy inputs.

Turning now to FIG. 3, illustrative interactions of the components of the system 100 will be described. For purposes of the illustration, it can be assumed that a network service 110 has been configured in a manner to implement a plurality of network services 112 on behalf of customers. Additionally, it can be assumed that the network service customer has access registrations, credentials or necessary permissions to access the policy management service 114.

At (1), the policy management service 114 can receive control policy inputs from customers. Illustratively, the control policy inputs correspond to a service context that can be utilized to identify at least one control policy to be implemented in a network service. The control policy input can be provided by customers in a variety of forms, which can include a specification of identified services, service types, or action items. In other embodiments, the control policy input can also explicitly exclude some information, such as the exclusion of any specific service or service type. By way of example, in some embodiments, the customer may access a user interface, such as a graphical user interface generated on a customer computing device 102 to provide the control policy input. The control policy input may be provided by manipulation of the interface to select from pre-existing categories or types of control policy inputs that can include a definition of a service and a control policy. In other embodiments, the control policy inputs can correspond to less structured data in which a customer can provide inputs (e.g., text or audible commands) that indicate a desired outcome/implementation. Examples of such inputs can include, but are not limited to, "encrypt all data" or "restrict access for Individual A" or "do not allow identification numbers to transmitted or displayed," etc. Still further, in other embodiments, customer control policy input may be in the form of a more traditional specification of an identified network service and corresponding control policy specification for the identified network service. In one example, the specification of the network service can include an identification of the network service that will implement the control policy. In another example, the specification of the network service can include a reference to an existing, instantiated network service and control policy that will function as a representative of a control policy to be implemented by additional network services. As will be described below, aspects of the present application will facilitate the identification of additional network services that should implement control policies corresponding to the complimentary function of the control policy input.

At (2), the policy management service 114 parses the control policy input to identify at least one network service and a control policy corresponding to the identified network service. Illustratively, the policy management service 114 can parse the control policy input to identify keywords or identifiers that correspond to at least one of an identified network service, network service type, action type, or other information. The policy management service 114 can utilize additional inputs, such as customer profile information, to facilitate the processing of the control policy input. For example, the policy management service 114 can utilize default information that may facilitate network service identification or control policy preferences. In other embodiments, the policy management service 114 can utilize historical control policy input processing results as suggestions for parsing and processing the current policy input (e.g., understanding semantics as to how the customer has previously phrased control policy input). In some embodiments, the policy management service 114 can leverage additional services, such as natural language processing services, machine learned algorithms and the like to parse and process the control policy input.

At (3), the policy management service 114 then identifies one additional network service that has been characterized as a complimentary function to the identified network service. In one embodiment, the policy management service 114 can identify the additional network service based on correlations of network services. For example, the policy management service 114 can maintain a matrix correlating an identified network service to a set of additional services with characterized complimentary functions. The matrix can be maintained and updated by the policy management service 114 based on individual customer utilizations/preferences or grouped experiences. In other embodiments, the policy management service 114 can corresponds to a manual selection of the additional services. In other embodiments, the policy management service 114 can conduct attribute searches based on the identified network service, network service type, action type, control policy to identify the additional network services or supplement identified network services. For example, if the control policy relates to security management, the policy management service 114 can utilize a network security attribute to search for network services that have been previously categorized as pertaining to network security. In this regard, it may be possible that the additional network services may not be currently configured in a complimentary manner but have the capability to be configured in such a manner and will be included in the set of additional network services.

In still other embodiments, the policy management service 114 can filter or process the list of additional network services, such as by removing duplicate or redundant network services, removing prohibited or unauthorized network services or limiting the number of network services that are configured based on customer preferences.

At (4), the policy management service 114 can translate or generate additional control policies for the identified additional network service that correspond to the previously identified control policy. Illustratively, the policy management service 114 can maintain a data store of control policies for the set of network services. In one aspect, the generation or translation of the control policies can include the identification of common fields or terms that can be copied or ported between control policies. In another aspect, the generation or translation of the control policies can include the utilization of correlation data, machine learned algorithms or other processing instructions, that identify associations between non-common fields or terms and translation/processing instructions between the non-common fields. For example, in one embodiment, a network access control list (NACL) associated for a first network service can be translated into a format that corresponds to an API authorization format for a complimentary network service. In this example, the policy management service 114 can maintain associations that identify relevant fields from the NACL that can be utilized for the API authorization format and how to modify the extracted data from the relevant fields into an appropriate format for the API authorization. Other examples of the translation or generation of the control policies can also be utilized in accordance with this aspect of the present application.

Illustratively, the policy management service can conduct one or more validation or verification processes based on the generated control policies. At (5), the policy management service 114 can implement validation or verification processes can including verification that the specific control policies either satisfy customer preferences or are otherwise not prohibited. For example, the policy management service can validate that the control policy would not exceed specified financial policies, thresholds, etc. At (6), the policy management service 114 can implement validation or verification processes can include verification that the specific control policies can be implemented by the additional network services or that would otherwise not result in conflicts or errors. Aspects of such validation and verification services can include processes for ensuring that the resulting translations are well formed and can be implemented by the respective network services. For example, the policy management service 114 can verify that the data included in the translated control policy does not contain erroneous data or incomplete data. Other aspects of such validation and verification processes can be referred to as drift detection in which differences in control policies attributes created by the different formats or values of the control policies do not create conflicts or result in undesired outcomes.

Thereafter, the policy management service 114 can cause the implementation of the set of generated control policies including the control policies for the identified service and the control policies for the additional network services. The policy management service 114 can provide confirmation or notifications to the customer that the control policy input has resulted in the generation of control policies. For example, the policy management service 114 can provide templates or other information that can be utilized by the customer for future implementations. Similarly, the policy management service 114 can store the correlated control policy inputs with the generated control policies in customer profiles for use in future iterations of the illustrated processes.

Turning now to FIG. 4, a routine 400 for control policy management by a policy management service 114 will be described. Routine 400 is illustratively implemented by the policy management service 114. As previously described, it can be assumed that a network service 110 has been configured in a manner to implement a plurality of network services 112 on behalf of customers. Additionally, it can be assumed that the network service customer has access registrations, credentials, or necessary permissions to access the policy management service 114.

At block 402, the policy management service 114 can receive control policy inputs from customers. Illustratively, the control policy inputs correspond to a service context that can be utilized to identify at least one control policy to be implemented in a network service. The control policy input can be provided by customers in a variety of forms, which can include a specification of identified services, service types, or action items. In other embodiments, the control policy input can also explicitly exclude some information, such as the exclusion of any specific service or service type. By way of example, in some embodiments, the customer may access a user interface, such as a graphical user interface generated on a customer computing device 102 to provide the control policy input. The control policy input may be provided by manipulation of the interface to select from pre-existing categories or types of control policy inputs that can include a definition of a service and a control policy. In other embodiments, the control policy inputs can correspond to less structured data in which a customer can provide inputs (e.g., text or audible commands) that indicate a desired outcome/implementation. Examples of such inputs can include, but are not limited to, "encrypt all data" or "restrict access for Individual A" or "do not allow identification numbers to transmitted or displayed," etc. Still further, in other embodiments, customer control policy input may be in the form of a more traditional specification of an identified network service and corresponding control policy specification for the identified network service. As described above, in one example, the specification of the network service can include an identification of the network service that will implement the control policy. In another example, the specification of the network service can include a reference to an existing, instantiated network service and control policy that will function as a representative of a control policy to be implemented by additional network services. The identified network service does not have to correspond to a network service that is associated with the customer. In some examples, the identified network service can correspond to a template or representative service associated with other customers that will serve as the control policy input. As will be described below, aspects of the present application will facilitate the identification of additional network services that should implement control policies corresponding to the complimentary function of the control policy input.

At block 404, the policy management service 114 parses the control policy input to identify at least one network service and a control policy corresponding to the identified network service. Illustratively, the policy management service 114 can parse the control policy input to identify keywords or identifiers that correspond to at least one of an identified network service, network service type, action type, or other information. The policy management service 114 can utilize additional inputs, such as customer profile information, to facilitate the processing of the control policy input. For example, the policy management service 114 can utilize default information that may facilitate network service identification or control policy preferences. In other embodiments, the policy management service 114 can utilize historical control policy input processing results as suggestions for parsing and processing the current policy input (e.g., understanding semantics as to how the customer has previously phrased control policy input). In some embodiments, the policy management service 114 can leverage additional services, such as natural language processing services, machine learned algorithms and the like to parse and process the control policy input. Additionally, as discussed above, the policy management service 114 can utilized input types or customer types to facilitate the parsing. For example, the policy management service 114 may utilize templates for control policy inputs generated from structured data inputs mechanisms, such as a graphical user interface with predefined data structures for transmitting the control policy input.

At block 406, the policy management service 114 then identifies one additional network service that has been characterized as a complimentary function to the identified network service. As described previously, the identification of the additional network services does not require that each individual network service be accessible or otherwise provide access to the customer via the network 106. Accordingly, the additional network services can include one or more processes that may be executable within the network service 110 without use of a network. In one embodiment, the policy management service 114 can identify the additional network service based on correlations of network services. For example, the policy management service 114 can maintain a matrix correlating an identified network service to a set of additional services with characterized complimentary functions. The matrix can be maintained and updated by the policy management service 114 based on individual customer utilizations/preferences or grouped experiences. In other embodiments, the policy management service 114 can utilize information that corresponds to a manual selection of the additional services. For example, the policy management service 114 can have tables or other relational information in which additional services are manually identified as having complimentary functions for purposes of generating the additional control policies. In this regard, the complimentary function may be determined based on a potential for utilization and does not require that the complimentary function be implemented for all iterations or instantiations of the identified network services.

In other embodiments, the policy management service 114 can conduct attribute searches based on the identified network service, network service type, action type, control policy to identify the additional network services or supplement identified network services. For example, if the control policy relates to security management, the policy management service 114 can utilize a network security attribute to search for network services that have been previously categorized as pertaining to network security. In this regard, it may be possible that the additional network services may not be currently configured in a complimentary manner but have the capability to be configured in such a manner and will be included in the set of additional network services.

In still other embodiments, the policy management service 114 can filter or process the list of additional network services, such as by removing duplicate or redundant network services, removing prohibited or unauthorized network services or limiting the number of network services that are configured based on customer preferences.

At block 408, the policy management service 114 can translate or generate additional control policies for the identified additional network service that correspond to the previously identified control policy. Illustratively, the policy management service 114 can maintain a data store of control policies for the set of network services. In one aspect, the generation or translation of the control policies can include the identification of common fields or terms that can be copied or ported between control policies. In another aspect, the generation or translation of the control policies can include the utilization of correlation data, machine learned algorithms or other processing instructions, that identify associations between non-common fields or terms and translation/processing instructions between the non-common fields. For example, in one embodiment, a network access control list (NACL) associated for a first network service can be translated into a format that corresponds to an API authorization format for a complimentary network service. In this example, the policy management service 114 can maintain associations that identify relevant fields from the NACL that can be utilized for the API authorization format and how to modify the extracted data from the relevant fields into an appropriate format for the API authorization. Other examples of the translation or generation of the control policies can also be utilized in accordance with this aspect of the present application.

Illustratively, the policy management service can conduct one or more validation or verification processes based on the generated control policies. At block 410, the policy management service 114 can implement validation or verification processes can including verification that the specific control policies either satisfy customer preferences or are otherwise not prohibited. For example, the policy management service can validate that the control policy would not exceed specified financial policies, thresholds, etc. For example, the policy management service 114 can verify that implementation of the generated control policies would not exceed financial limits provided by the customer. In another example, the policy management service 114 may ensure that the generated set of control policies would not otherwise violate global attributes or terms provided by the customer, such as use of encryption, access control lists, etc.

At block 412, the policy management service 114 can implement validation or verification processes can include verification that the specific control policies can be implemented by the additional network services or that would otherwise not result in conflicts or errors. Aspects of such validation and verification services can include processes for ensuring that the resulting translations are well formed and can be implemented by the respective network services. For example, the policy management service 114 can verify that the data included in the translated control policy does not contain erroneous data or incomplete data. Other aspects of such validation and verification processes can be referred to as drift detection in which differences in control policies attributes created by the different formats or values of the control policies do not create conflicts or result in undesired outcomes.

Thereafter, at block 414, the policy management service 114 can cause the implementation of the set of generated control policies including the control policies for the identified service and the control policies for the additional network services. The policy management service 114 can provide confirmation or notifications to the customer that the control policy input has resulted in the generation of control policies. Routine 400 terminates at block 416.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing control policies in network-based services, the system comprising:
  one or more computing devices associated with a processor and a memory for executing computer-executable instructions to implement a policy management service, wherein the policy management service is configured to:
    obtain a control policy input from a user related to a plurality of network services hosted on behalf of the user;
    parse the control policy input to identify a service context, wherein the service context includes an identified network service of the plurality of network services and at least one control policy to be implemented by the identified network service;
    configure the identified network service according to the control policy input to implement the at least one control policy; and
    configure at least one additional network service, not specified within the control policy input, to implement an additional control policy not specified within the control policy input, wherein the additional control policy is programmatically generated responsive to the control policy input, and wherein to configure at least one additional network service to implement the additional control policy the policy management service is configured to:
      identify the at least one additional network service not specified within the control policy input based on the identified network service, wherein the at least one additional network service is identified as having a complimentary function to the identified network service;
      translate the at least one control policy to be implemented by the identified network service into the additional control policy not specified within the control policy input;
      validate the additional control policy for compatibility with the at least one additional network service; and
      cause implementation of the additional control policy on the at least one additional network service.

2. The system as recited in claim 1, wherein the control policy input includes a specification of the identified network service.

3. The system as recited in claim 1, wherein the control policy input includes a specification of a network service type corresponding to the identified network service.

4. The system as recited in claim 1, wherein the control policy input includes a specification of action types implemented by one or more network services of the plurality of network services.

5. The system as recited in claim 1, wherein the policy management service identifies the at least one additional network service based on correlating the additional network service according to a correlation matrix.

6. The system as recited in claim 1, wherein the policy management service identifies the at least one additional network service based on an attribute search.

7. A method for managing network-based services comprising:
  parsing a control policy input associated with a network service user to identify a service context for a plurality of network services hosted on behalf of the network service user, wherein the service context includes an identified network service of the plurality of network services and at least one control policy to be implemented by the identified network service;
  configuring the identified network service according to the control policy input to implement the at least one control policy; and
  configuring at least one additional network service, not specified within the control policy input, to implement an additional control policy not specified within the control policy input, wherein the additional control policy is programmatically generated responsive to the control policy input, and wherein configuring the at least one additional network service to implement the additional control policy the policy management service comprises:
    identifying the at least one additional network service not specified within the control policy input based on the identified network service, wherein the at least one additional network service is identified as having a complimentary function to the identified network service corresponding to the identified service context;
    translating the at least one control policy to be implemented by the identified network services into the additional control policy not specified within the control policy input; and
    causing implementation of the additional control policy on the at least one additional network service.

8. The method as recited in claim 7 further comprising obtaining control policy inputs from a set of users related to a plurality of network services.

9. The method as recited in claim 8, wherein obtaining control policy inputs includes obtaining control policy inputs from a graphical user interface.

10. The method as recited in claim 8, wherein obtaining control policy inputs includes obtaining control policy inputs from textual inputs.

11. The method as recited in claim 8 further comprising validating the additional control policy for compatibility with the at least one additional network service.

12. The method as recited in claim 11, wherein validating the additional control policy for compatibility with the at least one additional network service comprising validating the additional control policy based on at least one of conflict detection, error checking, or user preference information.

13. The method as recited in claim 12, wherein the user preference information includes at least one prohibited policy attribute.

14. The method as recited in claim 12, wherein the user preference information includes policy attribute thresholds.

15. The method as recited in claim 7, wherein the control policy input includes a specification of the identified network service.

16. The method as recited in claim 7, wherein the control policy input excludes a specification of the identified network service.

17. The method as recited in claim 7, wherein the control policy input includes a specification of an instantiated control policy for a network policy as a representative control policy.

18. The method as recited in claim 7, wherein the control policy input includes a specification of a network service type associated with the plurality of network services.

19. The method as recited in claim 7, wherein the control policy input includes a specification of action types implemented by one or more network services of the plurality of network services.

20. A method for managing network-based services comprising:

obtaining a control policy input from one or more users related to a plurality of network services, wherein the control policy input user corresponds to a service context and wherein the service context includes an identified network service of the plurality of network services and at least one control policy to be implemented by the identified network service;

configuring the identified network service according to the control policy input to implement the at least one control policy; and configuring at least one additional network service, not specified within the control policy input, to implement an additional control policy not specified within the control policy input, wherein the additional control policy is programmatically generated responsive to the control policy input, and wherein configuring the at least one additional network service to implement the additional control policy the policy management service comprises:

identifying the at least one additional network service not specified within the control policy input based on the identified network service, wherein the at least one additional network service is identified as having a complimentary function to the identified network service;

translating the at least one control policy to be implemented by the identified network service into the additional control policy not specified within the control policy input; and causing implementation of the additional control policy on the at least one additional network service.

21. The method of claim 20 further comprising parsing the control policy input to identify the service context for network services.

22. The method as recited in claim 20 further comprising validating the additional control policy for compatibility with the at least one additional network service based on user preference information.

23. The method as recited in claim 20 further comprising validating the additional control policy for compatibility with the at least one additional network service based on at least one of conflict detection or error checking.

\* \* \* \* \*